(12) United States Patent
Magnezi et al.

(10) Patent No.: US 9,841,988 B1
(45) Date of Patent: Dec. 12, 2017

(54) UPDATING SERVICE VIRTUAL MACHINES USING A NEW IMAGE THAT IS CERTIFIED

(71) Applicant: Red Hat Israel, Ltd., Raanana (IL)

(72) Inventors: Nir Magnezi, Petah Tikva (IL); Michael Kolesnik, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/353,562

(22) Filed: Nov. 16, 2016

(51) Int. Cl.
*G06F 9/455* (2006.01)
*G06F 9/44* (2006.01)
*G06F 15/177* (2006.01)
*G06F 15/173* (2006.01)
*H04L 29/12* (2006.01)
*H04L 29/08* (2006.01)
*G06F 9/445* (2006.01)

(52) U.S. Cl.
CPC ............ *G06F 9/45558* (2013.01); *G06F 8/65* (2013.01); *H04L 61/2007* (2013.01); *H04L 67/02* (2013.01); *H04L 67/34* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,296,267 B2 | 10/2012 | Cahill et al. | |
| 8,332,848 B2 | 12/2012 | Azulay et al. | |
| 8,799,422 B1 * | 8/2014 | Qu | G06F 8/67 709/220 |
| 8,839,221 B2 * | 9/2014 | Sapuntzakis | G06F 8/65 717/168 |
| 8,849,971 B2 | 9/2014 | Ferris | |
| 8,914,793 B2 | 12/2014 | Cheng et al. | |
| 8,958,293 B1 | 2/2015 | Anderson | |
| 9,032,081 B1 | 5/2015 | North et al. | |
| 9,264,296 B2 | 2/2016 | Maldaner | |
| 2014/0101649 A1 | 4/2014 | Kamble et al. | |

(Continued)

OTHER PUBLICATIONS

Repko, Luke. Upgrade Citrix (XenServer) Tools for Windows Cloud Servers. (Jun. 27, 2016). support.rackspace.com/how-to/upgrade-citrix-xen-server-tools-for-windows-cloud-servers/ Accessed Oct. 10, 2016. 6 pages.

(Continued)

*Primary Examiner* — Bing Zhao
(74) *Attorney, Agent, or Firm* — Womble Bond Dickinson (US) LLP

(57) ABSTRACT

A processing device of a system may determine that a new service virtual machine (VM) image is available, the new service VM image comprising an update for a current service VM image. The system may identify a first instance of a first service VM that is presently running, wherein the first instance of the first service VM was created from the current service VM image and has a floating internet protocol (IP) address. The system may further create a second instance of the first service VM using the new service VM image, transfer active sessions of the first instance of the first service VM to the second instance of the first service VM, and reassign the floating IP address from the first instance of the first service VM to the second instance of the first service VM.

20 Claims, 6 Drawing Sheets

(56) References Cited

U.S. PATENT DOCUMENTS

2014/0189677 A1 7/2014 Curzi et al.
2015/0372935 A1* 12/2015 kervik .................... H04L 47/70
709/226

OTHER PUBLICATIONS

Singh, A., Juneja, D., & Malhotra, M. (2015). Autonomous agent based load balancing algorithm in cloud computing. Procedia Computer Science, 45, 832-841.

* cited by examiner

UPDATING SERVICE VIRTUAL MACHINES USING A NEW IMAGE THAT IS CERTIFIED

TECHNICAL FIELD

The present disclosure is generally related to management of service virtual machines by computer systems.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
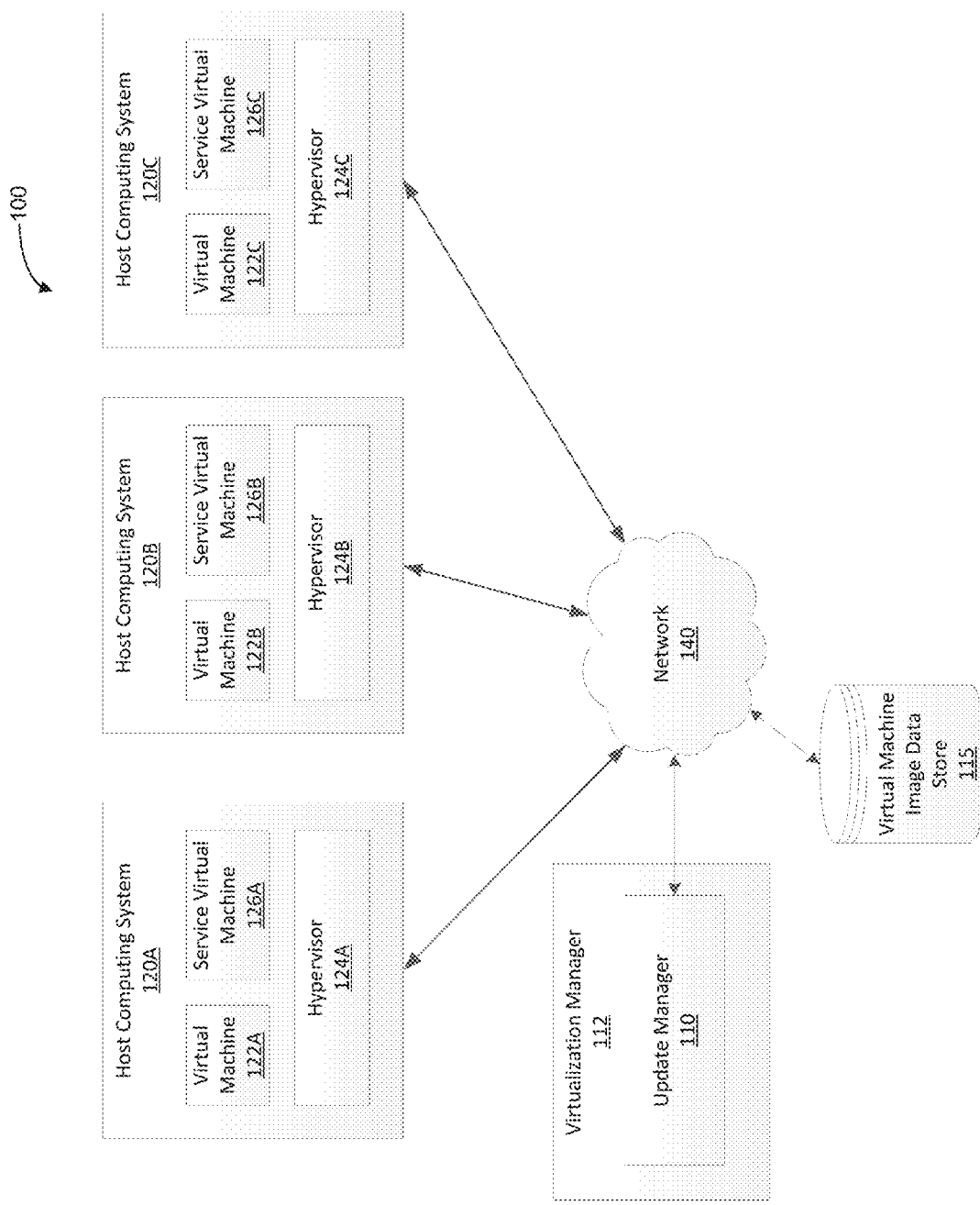
FIG. 1 depicts a block diagram of a system for updating service virtual machines, according to one or more aspects of the present disclosure.

Described herein are methods and systems for updating service virtual machines in a virtualized environment. The virtualized environment refers to a distributed computer system (e.g., a computer cluster, a data center, a cloud-based computer network, etc.) which includes host machines that each run one or more virtual machines by executing a hypervisor to abstract the physical layer, including processors, memory, and I/O devices, and present this abstraction to the virtual machines as virtual devices. The virtualized environment can be centrally managed by a virtualization manager that is coupled to the host machines over a network.

A service virtual machine refers herein to a virtual machine that provides a service to other virtual machines, applications, host computing systems, client devices, etc. For example, a service virtual machine may include one or more guest applications that are dedicated to performing a specific functionality within the virtualization environment. A service virtual machine may be instantiated from an image that includes components (e.g., guest applications, a guest operating system, etc.) that are needed to perform the specific functionality. The image may be "certified" (i.e., include an indicator verifying that the components of the image have been tested and are confirmed to operate properly). Multiple service virtual machines created from the same image can be running in the virtualized environment.

Service virtual machines may need to be periodically upgraded to provide improved or different performance (e.g., improved speed or security of the service virtual machines or additional features for the service virtual machines). Conventionally, such upgrades are done manually by a system administrator who can terminate one or more service virtual machines that were created from the original certified image, and instantiate one or more new service virtual machines from a new image that includes upgraded components. However, the new image may include untested components that can contain functional and configuration errors, and as such can result in improper operation of the newly created service virtual machines. In addition, conventional upgrade procedures do not keep track of upgrades and their timing. Furthermore, upgrading currently running service virtual machines in a manner discussed above may result in undesired termination of active sessions and loss of data.

Aspects of the present disclosure address the above and other deficiencies by providing a reliable upgrade mechanism for service virtual machines in a virtualized environment. In particular, a virtualization manager may include an update manager responsible for automatically upgrading service virtual machines that were created from an originally certified image to perform a certain service in the virtualized environment. For each service virtual machine, the update manager can create an additional service virtual machine from a new image that includes an update for the originally certified image. The additional service virtual machine can have a configuration similar to the original service virtual machine. The update manager may then verify that the new image can pass a certification test (e.g., by initiating a communication with the additional service virtual machine and determining whether the additional service virtual machine responds in an expected manner). If the new image passes the certification test, the update manager may then transfer active sessions from the original service virtual machine to the additional service virtual machine. The update manager may also transfer a floating IP address from the original service virtual machine to the additional service virtual machine such that the additional service virtual machine replaces the original service virtual machine.

Accordingly, aspects of the present disclosure improve the performance of service virtual machines in the virtualized environment by allowing an update manager to quickly and accurately update service virtual machines using a new image that passes a certification test. As a result, potential for errors is reduced, and a record of updates is maintained. In addition, active sessions are transferred to the updated version of the service virtual machine, preventing loss of data and ensuring that the service is provided in uninterrupted manner. Furthermore, aspects of the present disclosure may improve operation of computers in general by no longer wasting computing (processing) resources for creating service virtual machines based on uncertified images that do no operate correctly.

FIG. 1 is a block diagram of one illustrative example of a distributed computer system 100 that updates service virtual machines in a virtualized environment 100. The virtualized environment 100 may be a data center, a cluster of computers, a cloud network or any other group of nodes, including a plurality of host computing systems 120A-120C and a virtualization manager 112. The host computing systems 120A-120C may communicate to one another and to the virtualization manager 112 through a network 140. The network 140 may be, for example, a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Host computing system 120A may be a server, a mainframe, a workstation, a personal computer (PC), a mobile phone, a portable computing device, etc. Host computing system 120A may run a host operating system that manages the hardware resources of the computer system 120A and that provides functions such as inter-process communication, scheduling, memory management, and so forth. In some implementations, the host computing system 120A may also include a hypervisor 124A, which may be a computer program that provides a virtual operating platform for one or more virtual machines 122A, 126A, and manages the execution of the virtual machines 122A, 126A. In some implementations, one or more of host computing systems 120A-120C may execute fewer or additional virtual machines. In addition, one or more of host computing systems 120A-120C may execute additional applications directly by a host operating system. Service virtual machine 126 may provide a service such as load balancing service within the virtualization environment 100. Load balancing may refer to distributing workloads (e.g., tasks, traffic, etc.) across multiple computing resources (e.g., virtual machines 122 and 126, host computing systems 120, virtual devices, physical devices, disk drives, etc.) to optimize resource use, maximize throughput, minimize response time and avoid overload of resources within the virtualization environment 100. Alternatively, service virtual machine 126 may provide a domain name system (DNS) service or any other service within the virtualized environment 100.

The hypervisor 124A may take various forms. For example, the hypervisor 124A may be part of or incorporated in the operating system of computer system 120A, or the hypervisor 124A may be running on top of a host operating system. Alternatively, the hypervisor 124A may be a "bare metal" hypervisor that runs on hardware of the host computing system 120A without an intervening operating system. The hypervisor 124A manages system resources, including access to I/O devices, memory devices, processing devices, and the like of the host computing system 120A. The hypervisor 124A can present to virtual machines 122A an abstraction of the physical layer that may provide the same or different abstractions to various guest programs, such as guest operating system, guest applications, etc. Some examples of hypervisors include quick emulator (QEMU®), kernel mode virtual machine (KVM®), virtual machine monitor (VMM), etc.

The hypervisor 124A may support virtual machines 122A, 126A residing on the host computing system 120A. In some implementations, one or more virtual machines may reside on the host computing system 120A. The virtual machine 122A, 126A may execute programs as though the virtual machine 122A, 126A was a physical machine. In some implementations, there may be fewer or additional host computing systems 120A-120C than shown in FIG. 1.

The virtualization manager 112 may monitor and manage virtual machines 122 and 126 that are running on the host computing systems 120 and may receive information about the operation of each hypervisor 124A-124C managed by the server. The information received by virtualization manager 112 may include data describing the host computing system's storage, memory and networks as well as virtual machine creation, other host administration tasks, statistics gathering, and log collection. In some implementations, the virtualization manager 112 may assign a floating internet protocol (IP) address to a node (e.g., virtual machine 122, 126 or host computing system 120) in the virtualized environment. A floating IP address refers herein to an IP address that can be allocated to a currently running node.

The virtualization manager 112 may include an update manager 110. The update manager 110 may manage updates (e.g., upgrades or other changes) to service virtual machines 126. For example, the update manager 110 may manage updates in response to determining that a new service virtual machine image is available. A new service virtual machine image may be an update to a current service virtual machine image that was used to create one or more currently running service virtual machines such as service virtual machines 126A-126C. The update manager 110 may store service virtual machine information identifying service virtual machines that were created from the current service virtual machine image. This service virtual machine information may be stored in a virtual machine image data store 115 or a different data store.

The update manager 110 may determine that there is a new service virtual machine image based on a notification that a new service virtual machine image was uploaded, downloaded, or otherwise provided to the virtual machine image data store 115. The virtual machine image data store 115 may store images for various service virtual machines. The virtualization manager 112 or hypervisors 124A may use the images stored in the virtual machine image data store 115 to create new instances of service virtual machines. In various implementations, the virtual machine image data store 115 may be local to the update manager 110 or stored at a remote network location.

When a new service virtual machine image is available in the virtual machine image data store 115 as an update for the current service virtual machine image, it may be stored with an associated universal unique identification (UUID) for the new service virtual machine image at the virtual machine image data store 115. The update manager 110 may then use the service virtual machine information discussed above to determine which service virtual machines were created from the current service virtual machine image for which the new service virtual machine image has become available. In some implementations, the update manager 110 may determine which service virtual machines 126A-126C provide the same or similar service as the one associated with the new service virtual machine image based on an indicator associated with the new service virtual machine image. If the new service virtual machine image is for a load balancer, the update manager may identify the service virtual machines 126A-126C that provide a load balancing service, for instance. The update manager 110 may then update the identified running service virtual machines 126A-126C. To update a running service virtual machine 126A, the update manager 110 may create a new instance of the service virtual machine 126A using the new image. The update manager 110 may create the new instance using the same configuration as the original instance of the service virtual machine 126A. For example, the settings, connections, destination addresses, and the like may be setup the same on the new instance of the service virtual machine 126A. The update manager 110 may then determine whether the new image is certified (e.g., has an indicator verifying that the new image has passed a certification test). If not, the update manager 110 may perform a certification test as described herein. In some implementations, the update manager 110 may also test the new instance of the service virtual machine 126A (e.g., using the above certification test) to confirm that the new instance of the service virtual machine 126A is setup correctly. If the certification test is passed, the update manager 110 may transfer active sessions (sessions with clients at one or more nodes in the virtualized environment 100 and/or user devices), from the original service virtual machine 126A to the new instance of the service virtual machine and transfer a floating IP address from the original service virtual machine 126A to the new instance of the service virtual machine. Finally, the update manager 110 may terminate the original service virtual machine 126A.

Figure 2:
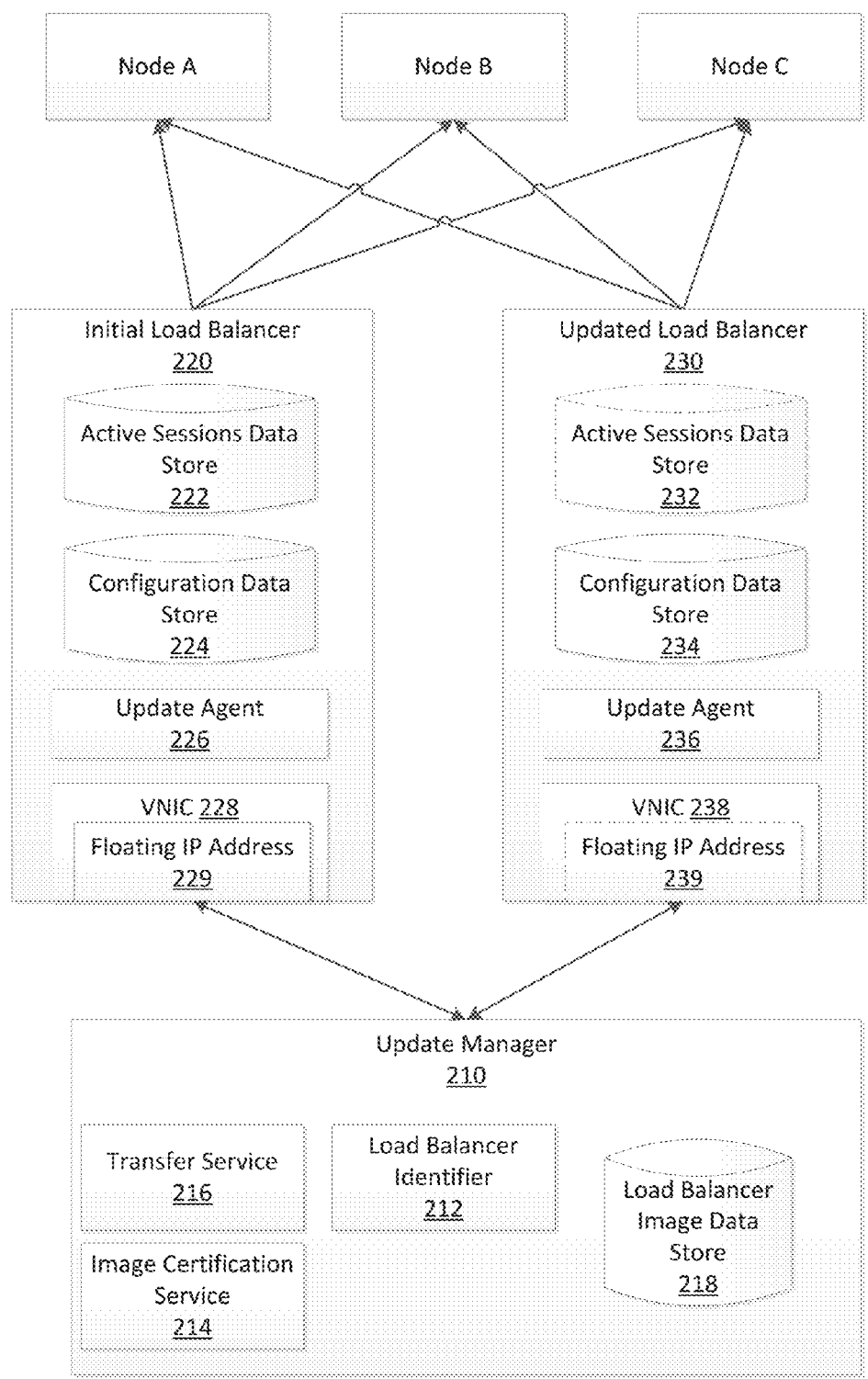
FIG. 2 depicts a block diagram of a system for updating service virtual machines, according to one or more aspects of the present disclosure.

FIG. 2 is a block diagram showing additional details of an example implementation of an update manager 210. For example, the update manager 210 may be the same or similar to update manager 110 described with reference to FIG. 1. In FIG. 2, a load balancer is provided as an example of a service virtual machine. However, an update manager 210 may manage updates of other types of service virtual machines as well. In such examples, the update manger 210 and other components may operate similarly to update other types of service virtual machines. In some implementations, other update managers 210 may be provided to handle different types of service virtual machines.

The update manager 210 may include a load balancer identifier 212, an image certification service 214, a transfer service 216, and a load balancer image data store 218. In some implementations, the load balancer image data store 218 may be in a location separate from the update manager 210. The update manager 210 may determine that a load balancer image data store 218 includes a new image for a load balancer. The update manager 210 may determine that there is a new load balancer image in response to receiving a notification that the new image has been uploaded or downloaded to the load balancer image data store 218 as an update for an existing load balancer image. The new image may have (include or be otherwise associated with) an identifier of the existing load balancer image. In some implementations, the update manager 210 may instead determine that there is a new load balancer image based on a new UUID for the image stored in the load balancer image data store 218 or in another manner.

After determining that there is a new load balancer image, a load balancer identifier 212 may identify one or more load balancers in a network that are to be updated with the new load balancer image. The load balancer identifier 212 may identify load balancers to update based on the UUID of the image of running load balancers, based on the stored information identifying load balancers created from the existing load balancer image, or based on other information.

In FIG. 2, the initial load balancer 220 may be identified by the load balancer identifier 212 as a load balancer that is to be updated. The initial load balancer 220 may be executed as a service virtual machine on a host computing system managed by a hypervisor.

The initial load balancer 220 includes an active sessions data store 222, a configuration data store 224, an update agent 226, and a virtual network interface card (VNIC) 228 having a floating IP address 229. The active sessions data store 222 may include data indicating the state of one or more active sessions. For example, the active sessions data store 222 may include a table indicating active connections of the initial load balancer 220. The configuration data store 224 may include data indicating a configuration of the initial load balancer 220. For example, a load balancer may be configured with one or more listener objects, one or more pool objects, and one or more member objects. The listener objects may determine which traffic the initial load balancer 220 uses. For example, a listener object may identify particular ports of a VNIC 228 to listen to for traffic. In some implementations, a load balancer may have more than one listener object. For example, A website load balancer may have a listener object that listens to http traffic with port 80 and a listener object that listens to https traffic with port 443. These listeners may point to the same pool object or to different pool objects. A pool object may identify a pool of resources to which the initial load balancer 220 may direct traffic. For example, the pool object may identify member objects that the initial load balancer 220 can use to direct traffic. In some implementations, a load balancer may have more than one pool object. For example, a file transfer protocol (FTP) load balancer may have different pool objects for different file types. A listener may determine which pool object to use based on the file type. The member objects then may identify a particular resource that the initial load balancer 220 may use. For example, the initial load balancer 220 can direct traffic to one of node A, node B, or node C. Node A, node B, and node C may be servers, network resources, cloud computing locations, or the like. In other examples, a load balancer may map traffic to fewer or additional nodes than shown in FIG. 2.

After the load balancer identifier 212 identifies the initial load balancer 220 as a load balancer to update, the update manager 210 may create a new instance of the load balancer, updated load balancer 230. In order to create the instance of the updated load balancer 230, the update manager may use the new load balancer image from the load balancer image data store 218. The updated load balancer 230 may be created as a new virtual machine, as a new application on an existing virtual machine, or as a new application on a new virtual machine. The update manager 210 may also create the instance of the updated load balancer 230 to have a configuration similar to that in the initial load balancer 220. To create the similar load balancer, the update manager 210 may receive data from the configuration data store 224. In order to provide a similar configuration, the initial load balancer 220 may also include an update agent 226. The update agent 226 may provide information to the update manager 210 or perform operations directed by update manager 210. For example, the update agent 226 may provide data from configuration data store 224. The update manager 210 may then use this data to create the instance of the updated load balancer 230 with the same configuration as the initial load balancer 220. For instance, if the initial load balancer 220 have member objects of node A, node B, and node C, the update manager 210 may create the updated load balancer 230 to have the same member objects.

In addition to creating the updated load balancer 230, the update manager 210 may include an image certification service 214 to determine that the update load balancer 230 passes a certification test. In order to test the updated load balancer 230, the image certification service 214 may provide a test input to the updated load balancer 230 and determine whether the response from the updated load balancer 230 is as expected. For example, the image certification service may provide a test URL to the updated load balancer 230 and determine whether the received response is the expected response to the test URL.

In response to determining that the updated load balancer image or the instance of the updated load balancer 230 passes a certification test, the image certification service 214 certifies the new load balancer image (e.g., by adding a certification indicator to the new load balancer image). Subsequently, when this certified load balancer image is used to create an additional instance of the load balancer, the above certification test may not be performed. Alternatively, this test may still be performed to verify that the additional instance of the load balancer has been set up correctly.

Further, a transfer service 216 of the update manager 210 may transfer active sessions from the initial load balancer 220 to the updated load balancer 230. In order to transfer active sessions, the transfer service 216 may receive data from active sessions data store 222. The transfer service 216 may then provide the data to update agent 236 so that the update agent 236 can store the data in active sessions data store 232. Depending on the updated load balancing image, the active sessions data may need to be translated to a different format for use by the updated load balancer 230. The translation may be performed by the update manager 210 (e.g., by the transfer service 216 or another module) or by the update agent 236 on the updated load balancer 230.

When the active sessions have been transferred to the updated load balancer, the transfer service 216 may transfer a floating IP address 229 to the updated load balancer. For example, the floating IP address 229 may be removed from the VNIC 228 and reassigned by the update manager 210 to the VNIC 238 on the updated load balancer 230. The update manager 210 may then terminate the initial load balancer 220 as the updated load balancer 230 will provide the load balancing service.

Figure 3:
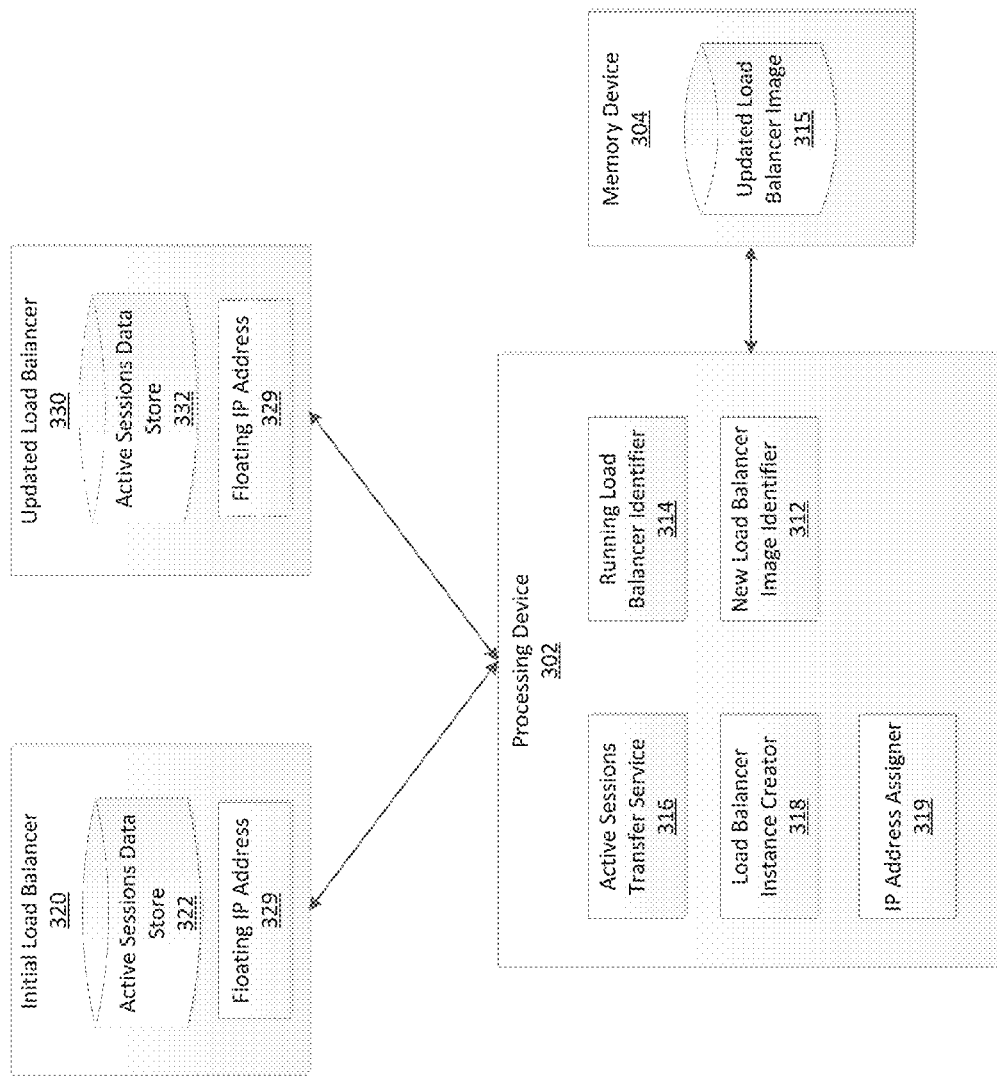
FIG. 3 depicts a block diagram of a system for updating service virtual machines, according to one or more aspects of the present disclosure.

FIG. 3 depicts a block diagram of a system for updating service virtual machines, according to one or more aspects of the present disclosure. The system in FIG. 3 may include a processing device 302 coupled to a memory device 304. The processing device 302 may execute a load balancer image identifier 312, a running load balancer identifier 314, an active sessions transfer service 316 and a transfer service 316, a load balancer instance creator 318, and an IP address assigner 319.

The load balancer image identifier 312 may determine that a new load balancer image is available. For example, the load balancer image identifier 312 may determine that a new load balancer image is available based on an updated load balancer image 315 stored in memory device 304.

The running load balancer identifier 314 may identify a load balancer that is provided by a presently running virtual machine. The load balancer may be identified based on a version number or other identification of a load balancer image associated with the presently running virtual machine. In some implementations, the running load balancer identifier 314 may identify a load balancer to update based on a stored list of load balancers in a network environment. For example, the running load balancer identifier 314 may identify running load balancers as those that are listed as running by a virtualization manager. The initial load balancer 320 may be identified as a presently running load balancer. The initial load balancer 320 may be a virtual machine or an application executed by a virtual machine.

The load balancer instance creator 318 may create a new instance of an identified load balancer based on the updated load balancer image 315. For example, the updated load balancer 330 may be created with a configuration matching the identified running load balancer. The load balancer instance creator 318 may create the updated load balancer 330 on a virtual machine or as an application executed by a virtual machine. In some implementations, the load balancer instance creator 318 may be created as a new application on a previously executing virtual machine.

The active sessions transfer service 316 may transfer active sessions from the initial load balancer 320 to the updated load balancer 330. Data representing the active sessions of the initial load balancer 320 may be stored in an active sessions data store 322. The active sessions transfer service 316 may receive the active sessions from the initial load balancer 320 provide the active sessions to the updated load balancer 330. The updated load balancer 330 may then store data associated with the active sessions in active sessions data store 332.

The IP address assigner 319 may reassign a floating IP address 329 from the initial load balancer 320 to the updated load balancer 330. After the floating IP address 329 is transferred to the updated load balancer 330, the updated load balancer 330 may operate to perform the service of a load balancer in place of the initial load balancer 320. In some implementations, the initial load balancer 320 may then be terminated.

Figure 4:
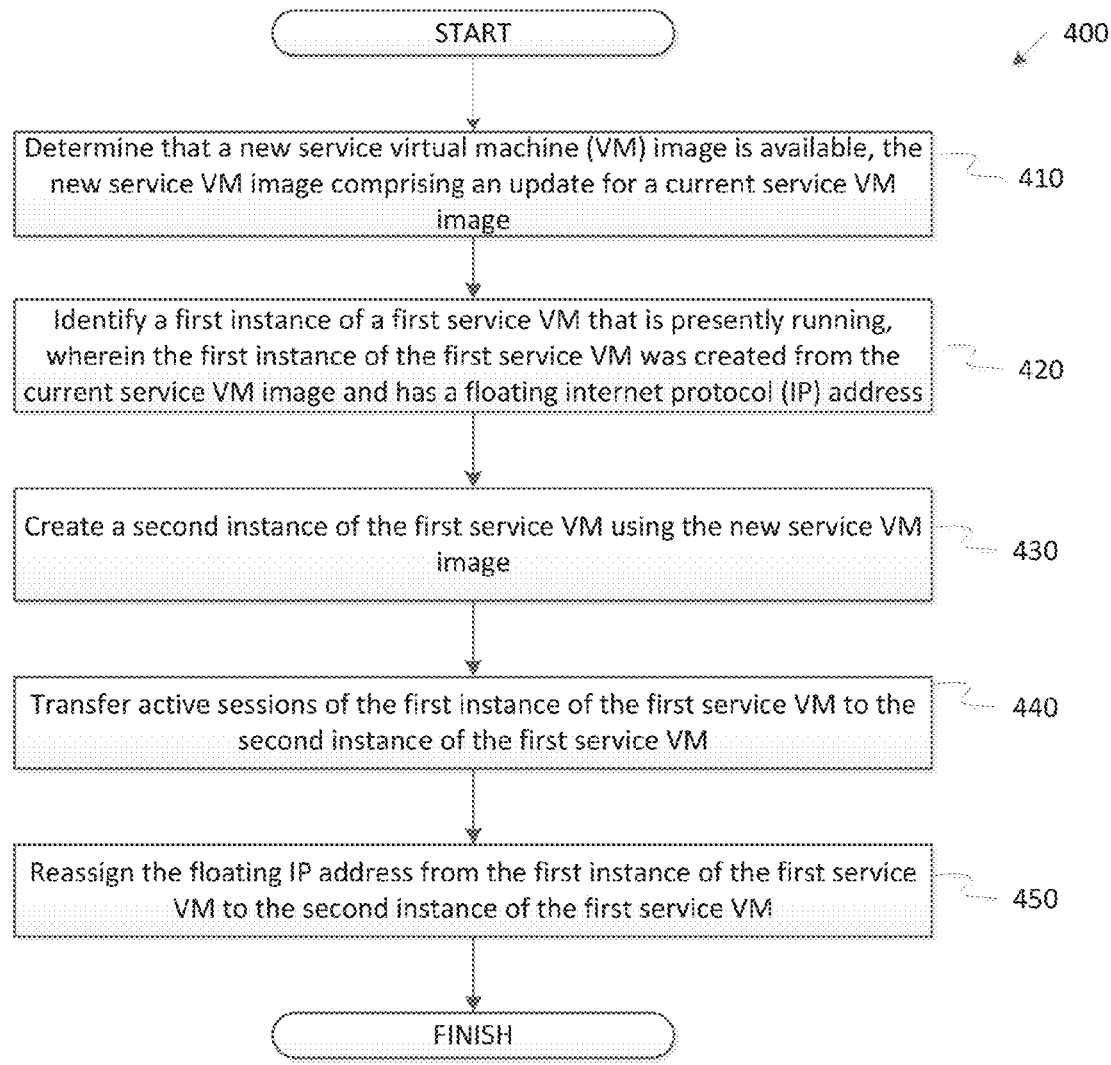
FIG. 4 is a flow diagram of a method for updating service virtual machine, according to one or more aspects of the present disclosure.

FIG. 4 is a flow chart depicting an example method 400 performed by an update manager to update a service virtual machine. Beginning in block 410, the update manager determines that a new service virtual machine image is available. The new service virtual machine image may include an update for a current service virtual machine image. In some implementations, the update manager may determine that a new service virtual machine image is available based on receiving a notification that a new image is available.

In block 420, the update manager identifies an instance of a first service VM that is presently running. The instance of the first service virtual machine that is running may have been created from a current service virtual machine image. Accordingly, the first service virtual machine may need to be updated to the new service virtual machine image. The instance of the first service virtual machine may have a floating IP address assigned to it.

In block 430, the update manager may create a new instance of the service virtual machine using the new service virtual machine image. For example, the update manager may provide a command to a hypervisor to create a new service virtual machine with the new service virtual machine image.

In block 440, the update manager transfers active session from the identified instance of the service virtual machine to the new instance of the service virtual machine. In some implementations, the active sessions may be represented by a session table that can be transferred to the new instance of the service virtual machine. In some implementations, the update manager may transfer the active sessions by instructing the identified instance of the service virtual machine to send data representing the active sessions to the new instance of the service virtual machine. In some implementations, the active sessions may be transferred in response to determining that the new service virtual machine image or the new instance of the service virtual machine is certified.

In block 450, the update manager may reassign a floating IP address associated with the identified instance of the service virtual machine to the new instance of the service virtual machine. After the floating IP address is transferred, the new instance of the service virtual machine may interact with various nodes when performing the designated service. The update manager may then terminate the identified instance of the service virtual machine.

The update manager may continue to identify and update service virtual machines. For example, for each identified instance of a service virtual machine, the update manager may create a new instance of the service virtual machine with a similar configuration. The update manager may then transfer active sessions to the new instance and reassign a floating IP address to the new instance.

Figure 5:
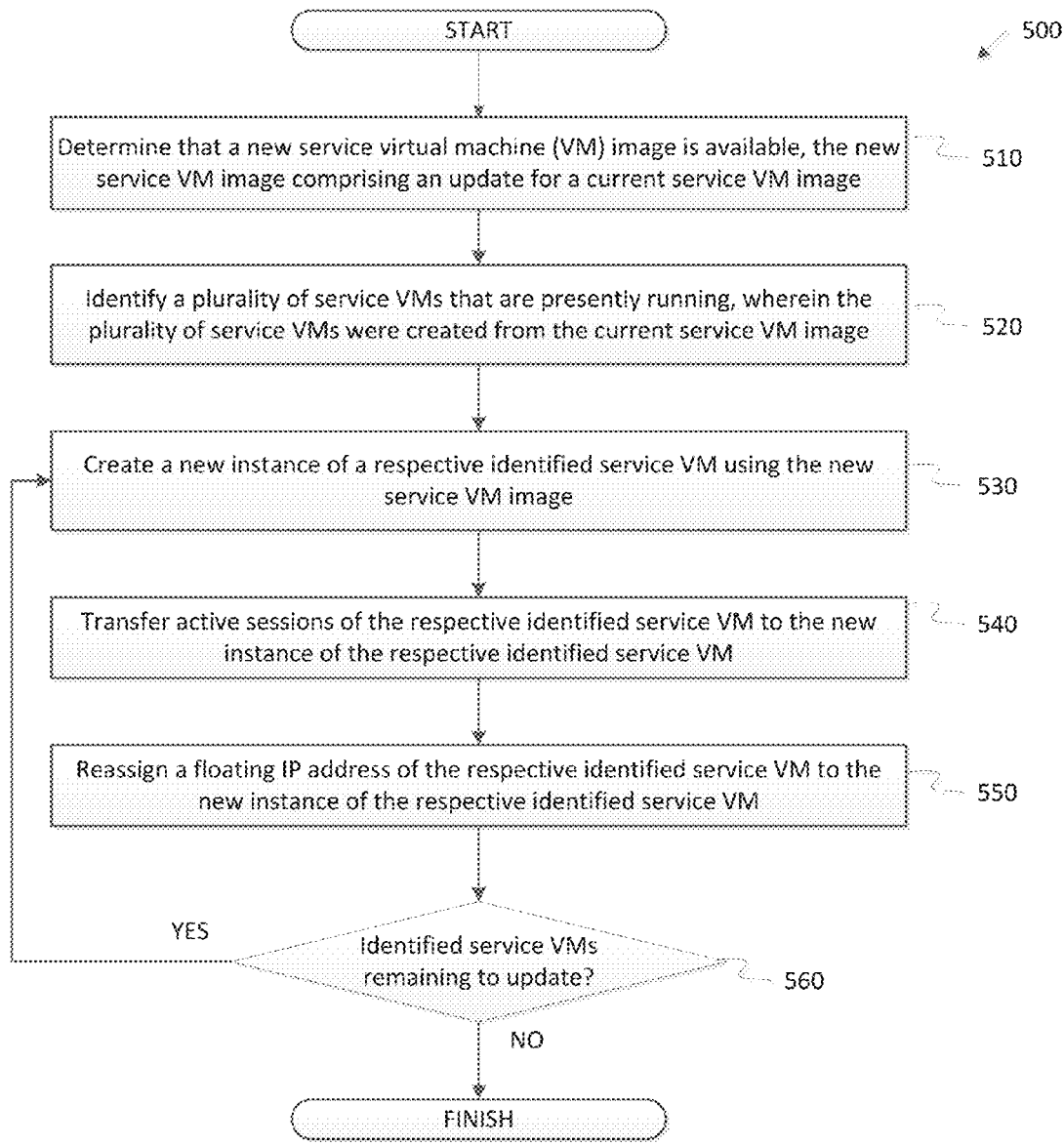
FIG. 5 is a flow diagram of a method for updating service virtual machines, according to one or more aspects of the present disclosure.

FIG. 5 is a flow chart depicting an example method 500 performed by an update manager to update service virtual machines. Beginning in block 510, the update manager determines that a new service virtual machine image is available. The new service virtual machine image may include an update for a current service virtual machine image. In some implementations, the update manager may determine that a new service virtual machine image is available based on receiving a notification that a new image is available.

In block 520, the update manager identifies a plurality of service virtual machines that are presently running. The identified instances of service virtual machines that are running may have been created from a current service virtual machine image. Accordingly, the identified service virtual machines may need to be updated to the new service virtual machine image. Each identified service virtual machine may have a floating virtual machine assigned to it.

In block 530, the update manager may create a new instance of a respective identified service virtual machine using the new service virtual machine image. For example, the update manager may provide a command to a hypervisor to create a new service virtual machine with the new service virtual machine image.

In block 540, the update manager transfers active sessions from the respective identified instance of the service virtual machine to the new instance of the service virtual machine. In some implementations, the active sessions may be represented by a session table that can be transferred to the new instance of the service virtual machine. In some implementations, the update manager may transfer the active sessions by instructing the identified instance of the service virtual machine to send data representing the active sessions to the new instance of the service virtual machine. In some implementations, the active sessions may be transferred in response to determining that the new service virtual machine image or the new instance of the service virtual machine is certified.

In block 550, the update manager may reassign a floating IP address associated with the respective identified instance of the service virtual machine to the new instance of the service virtual machine. After the floating IP address is transferred, the new instance of the service virtual machine may perform the service based on the new image. As the floating IP address no longer directs traffic to the identified instance of the load balancer, the update manager may terminate the identified instance of the load balancer.

In block 560, the update manager may determine whether there are additional identified service virtual machine remaining to update. If additional service virtual machines to update, the update manager may return to block 530 to update an additional respective identified service virtual machine. For example, the update manager may repeat the processes described with reference to blocks 530, 540, and 550 to each identified service virtual machine. If all of the identified service virtual machines have been updated, the update manager may finish the process described in reference to FIG. 5.

Figure 6:
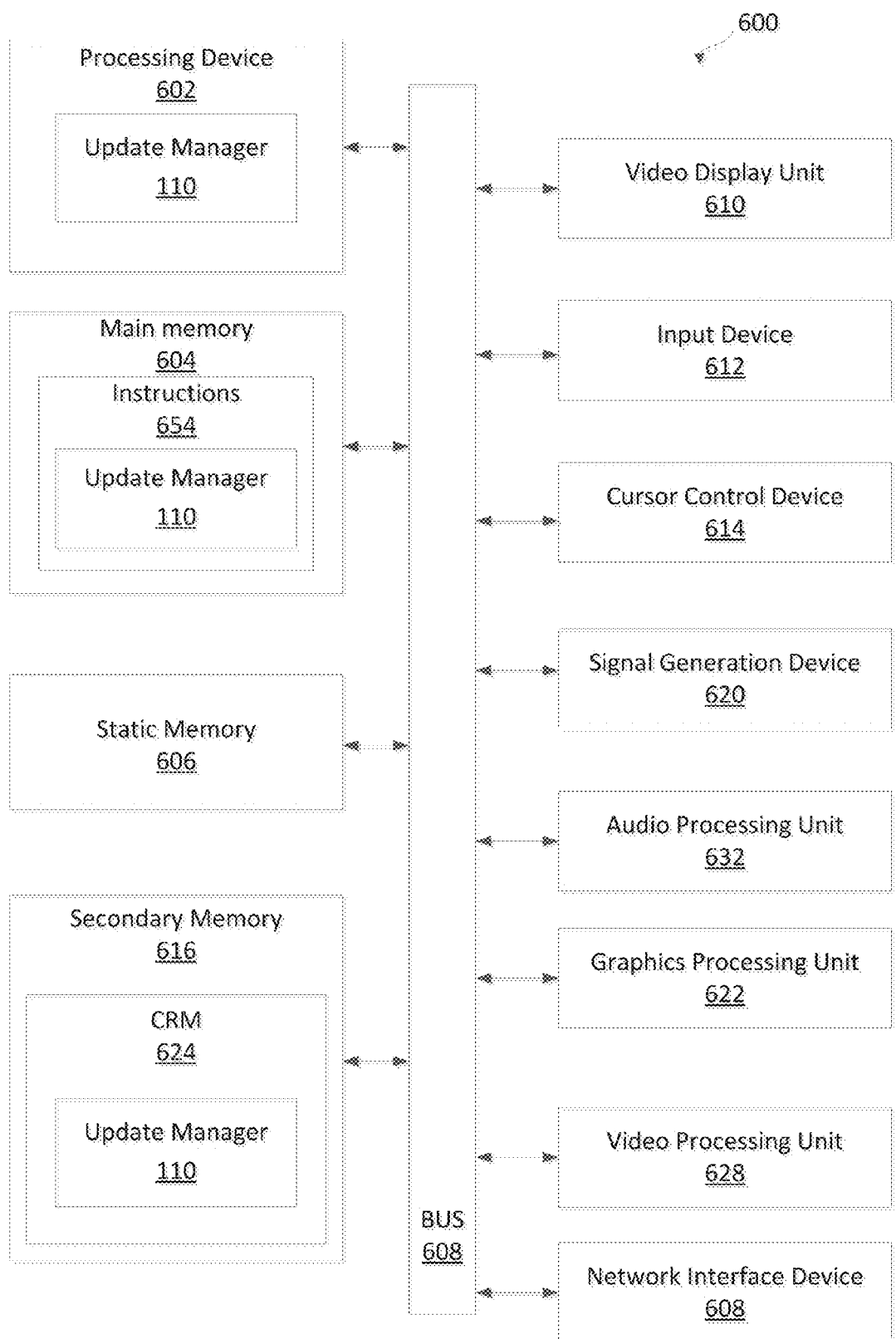
FIG. 6 is a block diagram of an example computer system operating in accordance with one or more aspects of the present disclosure.

FIG. 6 depicts an example computer system 600 which can perform any one or more of the methods described herein for updating service virtual machines. In one example, computer system 600 may correspond to virtualization manager 112 or update manager 110 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like. The computer system 600 may include a graphics processing unit 622, a video processing unit 628, and an audio processing unit 632.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium (CRM)) 624 on which is stored one or more sets of instructions embodying any one or more of the methodologies or functions described herein (e.g., update manager 110). The main memory 604 may also store, completely or partially, instructions 654 embodying any one or more of the methodologies or functions described herein (e.g., update manager 110). Furthermore, the processing device 602 may include instructions to implement update manager 110 during execution thereof by the computer system 600. The main memory 604 and the processing device 602 may also include machine-readable storage media.

While the computer-readable storage medium 624 is shown in an exemplary implementation to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

The modules, components and other features described herein (for example in relation to FIG. 1, 2 or 2) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "creating", "receiving", "determining", "executing", "performing", "transferring," "translating," "assigning," "reassigning," "identifying," "providing," "associating," "retrieving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific exemplary implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

What is claimed is:

1. A method comprising:
   determining, by a processing device, that a new service virtual machine (VM) image is available, the new service VM image comprising an update for a current service VM image;
   identifying, in view of determining that the new service VM image is available, a first service VM that is presently running, wherein the first service VM was created from the current service VM image and is assigned a floating internet protocol (IP) address;
   creating a second service VM using the new service VM image;
   determining that the new service VM image of the second service VM is certified by providing a test input to the second service VM and determining that a response of the second service VM to the test input is an expected response, wherein the new service VM image is indicated as being certified in view of the response being the expected response;

responsive to the new service VM image of the second service VM being certified, transferring active sessions of the first service VM to the second service VM; and reassigning, subsequent to transferring the active sessions, the floating IP address from the first service VM to the second service VM.

2. The method of claim 1, wherein the first service VM is a VM providing a load balancing service.

3. The method of claim 1, wherein transferring the active sessions of the first service VM comprises:

receiving a list of the active sessions from a first update agent of the first service VM; and providing the list of the active sessions to a second update agent of the second service VM.

4. The method of claim 1, wherein determining that the new service VM image of the second service VM is certified comprises determining that the new service VM image of the second service VM passes a certification test.

5. The method of claim 4, wherein determining that the new service VM image passes the certification test comprises:

providing the test input comprising a test uniform resource locator (URL) to the second service VM;

receiving the response from the second service VM, wherein the response is in view of the test URL; and determining whether the received response is the expected response to the test URL.

6. The method of claim 1, wherein;

the first service VM is associated with a first listener object, a first pool object and a first set of member objects; and creating the second instance of the first service VM comprises:

creating a second listener object from the first listener object, creating a second pool object from the first pool object, and creating a second set of member objects from the first set of member objects; and associating the second listener object, the second pool object, and the second set of member objects with the second instance of the first service VM.

7. The method of claim 1, further comprising terminating the first service VM in response to transferring the floating IP address.

8. The method of claim 1, wherein transferring the active sessions from the first service VM to the second service VM further comprises translating the active sessions to a format used by the second service VM.

9. The method of claim 1, further comprising:

uploading the new service VM image to an image repository; and retrieving an identifier for the new service VM image.

10. The method of claim 1, further comprising using the new service VM image when creating a third service VM.

11. An apparatus comprising:

a memory device; and a processing device coupled to the memory device, the processing device to:

determine that a new load balancer image is available, the new load balancer image comprising an update for a current load balancer image;

identify, in view of determining that the new load balancer image is available, a first load balancer that is provided by a presently running virtual machine, wherein the first load balancer was created from the current load balancer image and is assigned a floating internet protocol (IP) address;

create a second load balancer using the new load balancer image;

determine that the new load balancer image of the second load balancer is certified by providing a test input to the second load balancer and determining that a response of the second load balancer to the test input is an expected response, wherein the new load balancer image is indicated as being certified in view of the response being the expected response;

responsive to the new load balancer image of the second load balancer being certified, transfer active sessions of the first load balancer to the second load balancer; and reassign, subsequent to transferring the active sessions, the floating IP address from the first load balancer to the second load balancer.

12. The apparatus of claim 11, wherein to transfer the active sessions of the first load balancer, the processing device is further to:

receive a list of the active sessions from a first update agent of the first load balancer; and provide the list of the active sessions to a second update agent of the load balancer.

13. The apparatus of claim 11, wherein the processing device to determine that the new load balancer image of the second load balancer is certified comprises determining that the new load balancer image of the second load balancer passes a certification test.

14. The apparatus of claim 13, wherein to determine that the new load balancer image passes a certification test, the processing device is to:

provide the test input comprising a test uniform resource locator (URL) to the second load balancer;

receive the response from the second load balancer, wherein the response is in view of the test URL; and determine whether the received response is the expected response to the test URL.

15. The apparatus of claim 11, wherein;

the first load balancer is associated with a first listener object, a first pool object and a first set of member objects; and to create the second load balancer, the processing device is to:

create a second listener object from the first listener object, create a second pool object from the first pool object, and create a second set of member objects from the first set of member objects; and associate the second listener object, the second pool object, and the second set of member objects with the second load balancer.

16. A non-transitory computer readable medium, having instructions encoded thereon that when executed by a processing device cause the processing device to:

determine, by a processing device, that a new service virtual machine (VM) image is available, the new service VM image comprising an update for a current service VM image;

identify, in view of determining that the new service VM image is available, a plurality of service VMs that are presently running, wherein the plurality of service VMs were created from the current service VM image; and for each of the identified plurality of service VMs:

create a new instance of a respective identified service VM using the new service VM image;

determine that the new service VM image of the new instances is certified by providing a test input to the new instance of the respective identified service VM and determining that a response of the new instance of the respective identified service VM to the test input is an expected response, wherein the new service VM image is indicated as being certified in view of the response being the expected response;

responsive to the new service VM image of the instance being certified, transfer active sessions of the respective identified service VM to the new instance of the respective identified service VM; and reassign, subsequent to transferring the active sessions, a floating IP address of the respective identified service VM to the new instance of the respective identified service VM.

17. The non-transitory computer readable medium of claim 16, wherein the first service VM is a VM providing a load balancing service.

18. The non-transitory computer readable medium of claim 17, wherein the instructions further cause the processing device to terminate the identified service VM in response to transferring the floating IP address.

19. The non-transitory computer readable medium of claim 17, wherein to transfer the active sessions of the respected identified service VM to the new instance of the respected identified service VM, the instructions further cause the processing device to translate the active sessions to a format used by the new instance of the respected identified service VM.

20. The non-transitory computer readable medium of claim 17, wherein the instructions further cause the processing device to:

upload the new service VM image to an image repository; and retrieve an identifier for the new service VM image.

* * * * *